United States Patent [19]
Kuwano et al.

[11] Patent Number: 6,146,681
[45] Date of Patent: Nov. 14, 2000

[54] METHOD FOR PRODUCING A POROUS BAKED FOOD MATERIAL

[75] Inventors: Yukata Kuwano; Eiji Okaya; Mitsunori Takahara, all of Saitama, Japan

[73] Assignee: Meiji Seika Kaisha Ltd., Tokyo, Japan

[21] Appl. No.: 09/202,417

[22] PCT Filed: Jun. 13, 1997

[86] PCT No.: PCT/JP97/02057
§ 371 Date: May 10, 1999
§ 102(e) Date: May 10, 1999

[87] PCT Pub. No.: WO97/47207
PCT Pub. Date: Dec. 18, 1997

[30] Foreign Application Priority Data

Jun. 14, 1996 [JP] Japan ..................... 8-154670

[51] Int. Cl.$^7$ ..................... A23G 3/00
[52] U.S. Cl. ............. 426/549; 426/94; 426/305; 426/306; 426/282; 426/660
[58] Field of Search ............. 426/447, 593, 426/549, 305, 306, 291, 282, 601, 94, 553, 659, 660

[56] References Cited

U.S. PATENT DOCUMENTS

| 4,572,835 | 2/1986 | Hachiya et al. | 426/306 |
| 4,587,128 | 5/1986 | Cummings | 426/303 |
| 4,812,318 | 3/1989 | Finkel | 426/94 |
| 4,971,820 | 11/1990 | Likuski et al. | |
| 5,370,888 | 12/1994 | Hachiya et al. | 426/282 |

FOREIGN PATENT DOCUMENTS

| 52-148662 | 12/1977 | Japan | A23G 1/00 |
| 63-251047 | 10/1988 | Japan | A23G 1/00 |
| 3-180163 | 8/1991 | Japan. | |
| 4-370062 | 12/1992 | Japan. | |
| 6-181725 | 7/1994 | Japan. | |
| WO 98 03080 | 1/1998 | Japan. | |
| 10-150917 | 6/1998 | Japan. | |
| 63-251047 | 10/1998 | Japan. | |
| 10-323155 | 12/1998 | Japan. | |

*Primary Examiner*—Keith D. Hendricks
*Attorney, Agent, or Firm*—Sughrue, Mion, Zinn, Macpeak & Seas, PLLC

[57] ABSTRACT

The present invention provides a porous baked food material having excellent taste and texture. According to the method for the production of the food material, a baked porous food, such as a baked cake is combined with a fat based confectionery such as chocolate. The baked porous food is embedded in a fat based confectionery in its molten liquid state, degassed under a reduced pressure and subsequently returned to ambient pressure. Impregnation of the aerated food material with the fat based confectionery is thereby accomplished.

12 Claims, No Drawings

METHOD FOR PRODUCING A POROUS BAKED FOOD MATERIAL

This application is a 371 of PCT/JP97/02057, filed Jun. 13, 1997.

TECHNICAL FIELD

This invention relates to a method for the production of so-called chocolate confectionery and the like composite fat based confectioneries (fat based confectioneries mixed with edible food stuffs which contains air bubbles in the structure) and can provide composite fat based confectioneries having markedly excellent taste and texture.

BACKGROUND ART

In general, the composite fat based confectioneries in which aerated food materials (containing air bubbles in the structure) such as biscuits, crackers, pies, wafers and the like baked cakes, okaki, arare and the like rice cakes (traditional Japanese rice cookies) and puffs, popcorn and the like puffed cakes are combined with chocolates, fat creams and the like fat based confectioneries are roughly divided into the following groups from the production point of view.

(i) A composite fat based confectionery in which entire or partial portion of the surface of a combination food material is coated with a fat based confectionery using enrober or the like means (for example, a biscuit one side of which is coated with chocolate).

(ii) A composite fat based confectionery in which a fat based confectionery is packed in a mold and then, before the fat based confectionery is solidified, a part or all of a combination food material is inserted into the fat based confectionery which is subsequently solidified and formed (for example, a chocolate confectionery produced by inserting a part of a rod-shaped biscuit into a mold packed with chocolate and then effecting solidification and forming).

(iii) A composite fat based confectionery in which a fat based confectionery is injected into a combination food material formed into a hollow shape (for example, a dried cream puff packed with a fat cream).

(iv) A composite fat based confectionery in which a granular combination food material is mixed with a fat based confectionery, and said mixture is solidified and formed using a mold or the like (for example, a chocolate bar containing a puff).

(v) A composite fat based confectionery in which a combination food material is sandwiched with a fat based confectionery (for example, a biscuit sandwiched with a fat cream).

(vi) A composite fat based confectionery in which a fat based confectionery is packed in a combination food material formed into a container of a boat or the like shape (for example, a chocolate confectionery produced by packing chocolate in a tart cup).

In recent years, demand for the just described composite fat based confectioneries has been increasing because of the variation of liking by consumers. Since the taste of a fat based confectionery itself in a composite fat based confectionery is reduced due to its characteristics, such confectioneries are received favorably by consumers who like light taste and texture on one hand, but there are a large number of consumers on the other hand who like composite fat based confectioneries having more strong taste of the fat based confectionery. When these present conditions are taken into consideration, the aforementioned composite fat based confectioneries of (i) to (vi) have the following disadvantages.

(1) In the composite fat based confectioneries obtained by the production methods (i), (iii), (v) and (vi), ratio of the fat based confectionery cannot be increased exceeding a certain level, so that taste of the fat based confectionery cannot be strengthened exceeding a certain level.

(2) In the composite fat based confectioneries obtained by the production method (iii), its fat based confectionery is not exposed, so that the fat based confectionery is poor in its existential feeling in terms of its appearance.

(3) In the composite fat based confectioneries obtained by the production methods (ii) and (iv), it is possible to increase ratio of the fat based confectionery at will but, in that case, the combination food material has poor taste and texture and cannot be distinguished from the fat based confectionery itself.

(4) In the composite fat based confectioneries obtained by the methods other than (iv), the combination food material and the fat based confectionery show different tastes when chewed, so that they lack in a one-bodied feeling as a whole and it cannot be denied that their completeness is low in view of the taste. The composite fat based confectionery obtained by the production method (iv) has a one-bodied feeling of its combination food material and fat based confectionery, but, since a granular combination food material is used, significant characteristics cannot be added thereto in terms of its texture.

The present invention has been accomplished taking the aforementioned present situation into consideration, and its object is to provide a composite fat based confectionery which has high ratio of its fat based confectionery and thereby has a strong taste of the fat based confectionery, shows excellent one-bodied feeling of its combination food material and fat based confectionery, has excellent characteristics in terms of the texture and also is rich in the existential feeling of the fat based confectionery in appearance.

DISCLOSURE OF THE INVENTION

As a result of the extensive investigation to resolve the aforementioned problems, the inventors of the present invention have found as a result of the efforts that completely novel composite fat based confectioneries having excellent taste and texture can be obtained by impregnating an aerated food material such as baked cakes with a fat based confectionery such as chocolate, thus resulting in the accomplishment of the present invention.

The present invention comprises the following constructions.

1. A method for producing composite fat based confectioneries in which baked cakes and the like aerated food materials are combined with chocolate and the like fat based confectioneries, which comprises embedding an aerated food material in a fat based confectionery in its molten liquid state, degassing the aerated food material under a reduced pressure and subsequently returning the atmosphere to ordinary pressure thereby effecting impregnation of the aerated food material with the fat based confectionery.

2. The method for producing composite fat based confectioneries according to the aforementioned 1, wherein pressure in the closed system where the fat based confectionery and the aerated food material are included is 660 mmHg or less at the time of decompression, when specific gravity of the aerated food material is d (g/ml) and weight ratio (%) of the fat based confectionery in the composite fat based confectionery of interest is 100×0.16(1−d)/{d+0.16(1−d)} or more.

3. The method for producing composite fat based confectioneries according to the aforementioned 1, wherein pressure in the closed system where the fat based confectionery and the aerated food material are included is 480 mmHg or less at the time of decompression, when specific gravity of the aerated food material is d (g/ml) and weight ratio (%) of the fat based confectionery in the composite fat based confectionery of interest is 100×0.44(1−d)/{d+0.44(1−d)} or more.

4. The method for producing composite fat based confectioneries according to the aforementioned 1, wherein pressure in the closed system where the fat based confectionery and the aerated food material are included is 380 mmHg or less at the time of decompression, when specific gravity of the aerated food material is d (g/ml) and weight ratio (%) of the fat based confectionery in the composite fat based confectionery of interest is 100×0.6(1−d)/{d+0.6(1−d)} or more.

The illustrative methods and effects of the present invention are as follows.

A baked cake or the like aerated food material is embedded in a fat based confectionery in its molten liquid state, and the closed system containing both of them is decompressed and then returned to ordinary pressure. By this treatment, impregnation of the aerated food material with the fat based confectionery is effected, and a composite fat based confectionery having excellent taste and texture is obtained.

According to the present invention, the aforementioned decompression range is optionally decided based on the kinds or physical properties of the aerated food material and fat based confectionery, such as specific gravity, viscosity and the like, and the ratio of fat based confectionery in the final product. Also, the ratio of fat based confectionery is controlled by optionally adjusting space volume, volume of aerated food material, air content (degassable amount) and the like in the closed system, decompression speed, soaking period, soaking temperature and the like.

According to the present invention, since the ratio of fat based confectionery generally increases as the pressure decreases when the same aerated food material is used under a pressure of 660 mmHg or less at the time of decompression, setting of the pressure is optionally selected by the ratio of fat based confectionery in the composite fat based confectionery of interest.

In this case, when specific gravity of the aerated food material is already known, the following formulae (1) to (3) can be employed as a measure of the ratio of fat based confectionery in the composite fat based confectionery of interest.

In the following formulae, $\Delta w$ (%) is weight ratio (%) of the fat based confectionery in the composite fat based confectionery of interest, and P is pressure in the closed system at the time of decompression.

$$\Delta w(\%) \geq 100 \times 0.16(1-d)/\{d+0.16(1-d)\} \text{ (when } P \leq 660 \text{ mmHg)} \quad (1)$$

$$\Delta w(\%) \geq 100 \times 0.44(1-d)/\{d+0.44(1-d)\} \text{ (when } P \leq 480 \text{ mmHg)} \quad (2)$$

$$\Delta w(\%) \geq 100 \times 0.6(1-d)/\{d+0.6(1-d)\} \text{ (when } P \leq 380 \text{ mmHg)} \quad (3)$$

The aerated food material impregnated with a fat based confectionery is made into a composite fat based confectionery by removing excess fat based confectionery from its peripheral by air blow, vibration or the like known means as occasion demands and then by cooling and solidifying it by a known method. The thus obtained composite fat based confectionery is possessed of novel characteristics which cannot be found in the prior art counterparts, because it has high ratio of its fat based confectionery and thereby has a strong taste of the fat based confectionery, shows excellent one-bodied feeling of its combination food material and fat based confectionery, has excellent characteristics in terms of the texture and also is rich in the existential feeling of the fat based confectionery in appearance. In addition, variation of the taste and texture of this composite fat based confectionery can be expanded through its processing by coating and the like known methods.

The apparatus necessary for the present invention, in addition to the conventional fat based confectionery production apparatus, is only an apparatus for decompression treatment which is markedly simple and cheap.

BEST MODE OF CARRYING OUT THE INVENTION

Examples of the present invention are given below by way of illustration and not by way of limitation.

INVENTIVE EXAMPLE 1

A hard biscuit having a specific gravity of 0.6 was embedded in a tempering-treated chocolate dough having an oil content of 40% and a viscosity of 10,000 centipoise, and they were put into a closed type vacuum container, subjected to a decompression treatment to 400 mmHg and then immediately returned to ordinary pressure. Excess chocolate dough around the chocolate-impregnated hard biscuit was removed by air blowing and then the resulting hard biscuit was cooled and solidified on a belt, thereby obtaining a composite fat based confectionery containing 31% of chocolate and having excellent taste and texture.

INVENTIVE EXAMPLE 2

A composite fat based confectionery containing 49% of chocolate and having excellent taste and texture was obtained in the same manner as described in Inventive Example 1, except that the pressure at the time of decompression was changed to 100 mmHg.

INVENTIVE EXAMPLE 3

A puffed cake having a specific gravity of 0.3 mainly made of wheat flour was embedded in a tempering-treated chocolate dough having an oil content of 35% and a viscosity of 30,000 centipoise, and they were put into a closed type vacuum container, subjected to a decompression treatment to 160 mmHg and then immediately returned to ordinary pressure. Excess chocolate dough around the chocolate-impregnated cake was removed by air blowing and then the resulting cake was cooled and solidified on a belt, thereby obtaining a composite fat based confectionery containing 72% of chocolate and having excellent taste and texture.

INVENTIVE EXAMPLE 4

A composite fat based confectionery containing 59% of chocolate and having excellent taste and texture was obtained in the same manner as described in Inventive Example 3, except that the pressure at the time of decompression was changed to 380 mmHg.

INVENTIVE EXAMPLE 5

A composite fat based confectionery containing 51% of chocolate and having excellent taste and texture was obtained in the same manner as described in Inventive Example 3, except that the pressure at the time of decompression was changed to 480 mmHg.

INDUSTRIAL APPLICABILITY

Composite fat based confectioneries having markedly excellent taste and texture can be obtained by the use of the production method of the present invention.

What is claimed is:

1. A method for producing a porous baked food material in which a baked porous food is combined with a fat based confectionery, said method comprising embedding baked porous food in a fat based confectionery in its molten liquid state, degassing the baked porous food under a reduced pressure in a closed system and subsequently returning the atmosphere to ambient pressure thereby effecting impregnation of the baked porous food with the fat based confectionery.

2. The method for producing a porous baked food material according to claim 1, wherein pressure in the closed system where the fat based confectionery and the baked porous food are included is 660 mmHg or less at the time of decompression, and weight ratio (%) of the fat based confectionery in the porous baked food material is $100 \times 0.16(1-d)/\{d+0.16(1-d)\}$ or more wherein specific gravity of the baked porous food is d (g/ml).

3. The method for producing a porous baked food material according to claim 1, wherein pressure in the closed system where the fat based confectionery and the baked porous food are included is 480 mmHg or less at the time of decompression, and weight ratio (%) of the fat based confectionery in the porous baked food material is $100 \times 0.44(1-d)/\{d+0.44(1-d)\}$ or more wherein specific gravity of the baked porous food is d (g/ml).

4. The method for producing a porous baked food material according to claim 1, wherein pressure in the closed system where the fat based confectionery and the baked porous food are included is 380 mmHg or less at the time of decompression, and weight ratio (%) of the fat based confectionery porous baked food material is $100 \times 0.6(1-d)/\{d+0.6(1-d)\}$ or more wherein specific gravity of the baked porous food is d (g/ml).

5. The method of claim 1 wherein the baked porous food is a cake.

6. The method of claim 1 wherein the fat based confectionery is chocolate.

7. The method of claim 2, wherein the baked porous food is a cake.

8. The method of claim 2, wherein the fat based confectionery is chocolate.

9. The method of claim 3, wherein the baked porous food is a cake.

10. The method of claim 3, wherein the fat based confectionery is chocolate.

11. The method of claim 4, wherein the baked porous food is a cake.

12. The method of claim 4, wherein the fat based confectionery is chocolate.

* * * * *